April 9, 1946.                D. H. SLOAN                 2,398,162
             MEANS AND METHOD FOR ELECTRON ACCELERATION
                    Filed Dec. 16, 1941          6 Sheets-Sheet 1
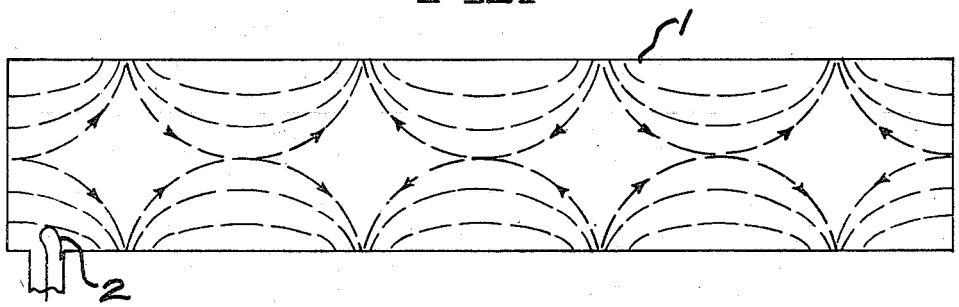
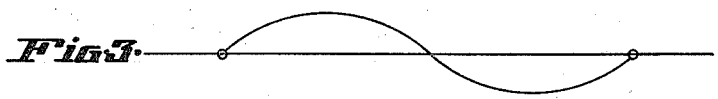
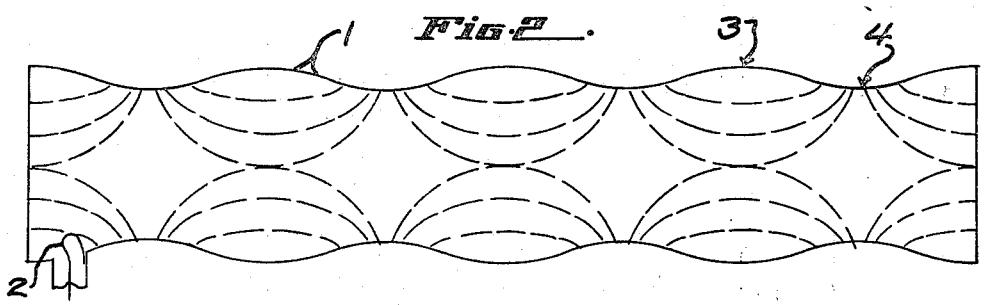
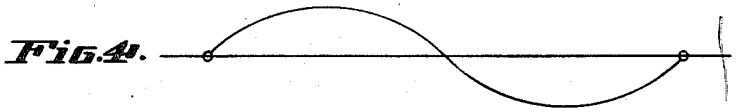
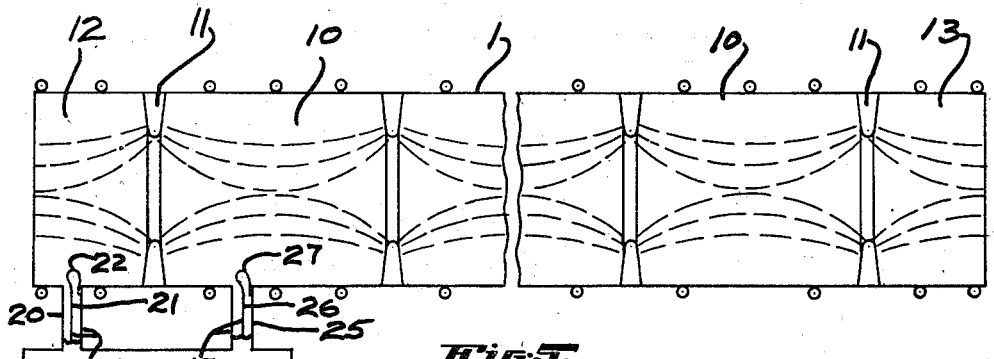
INVENTOR.
DAVID H. SLOAN
BY
ATTORNEYS.

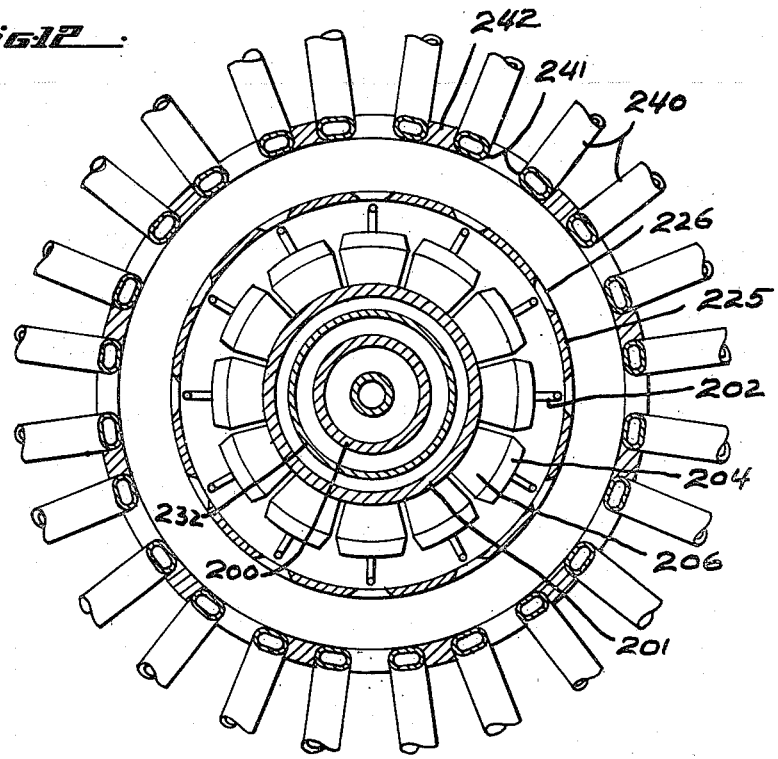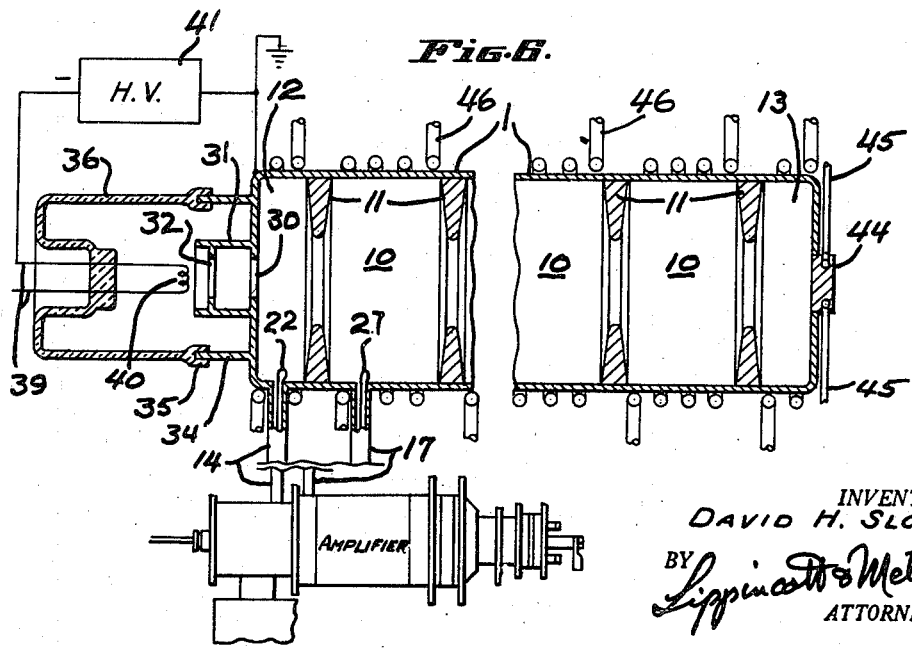

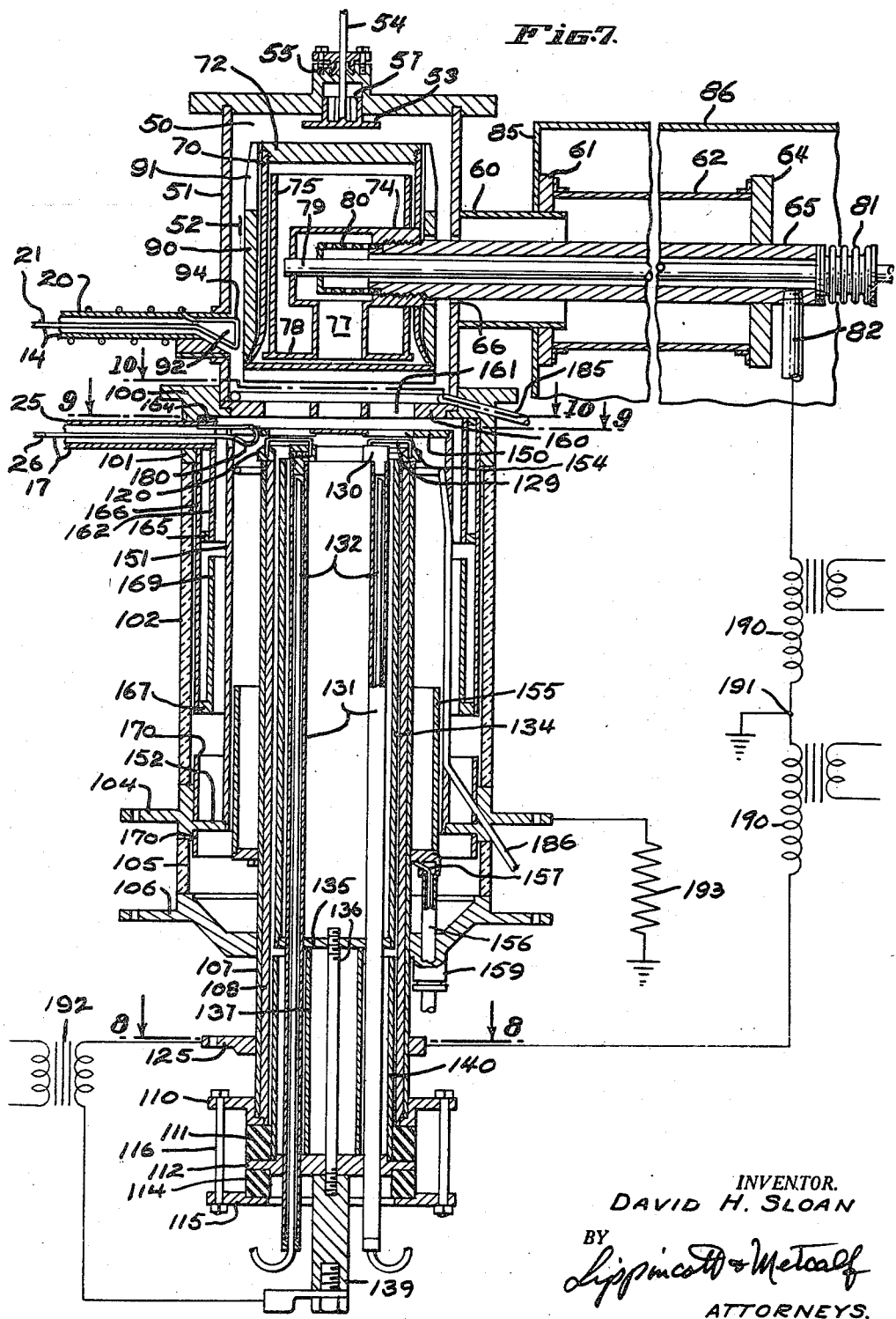

INVENTOR.
DAVID H. SLOAN
BY
Lippincott & Metcalf
ATTORNEYS.

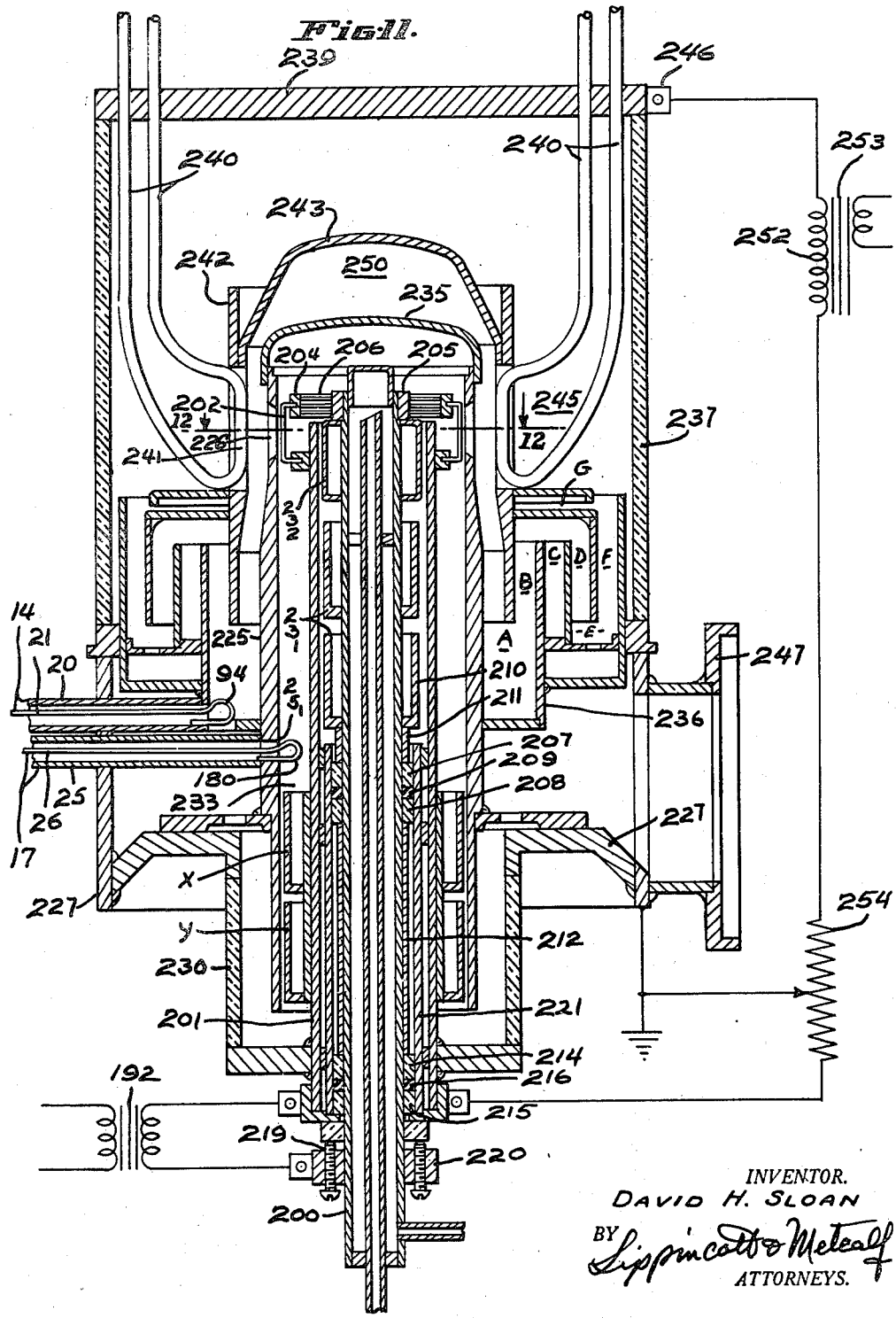

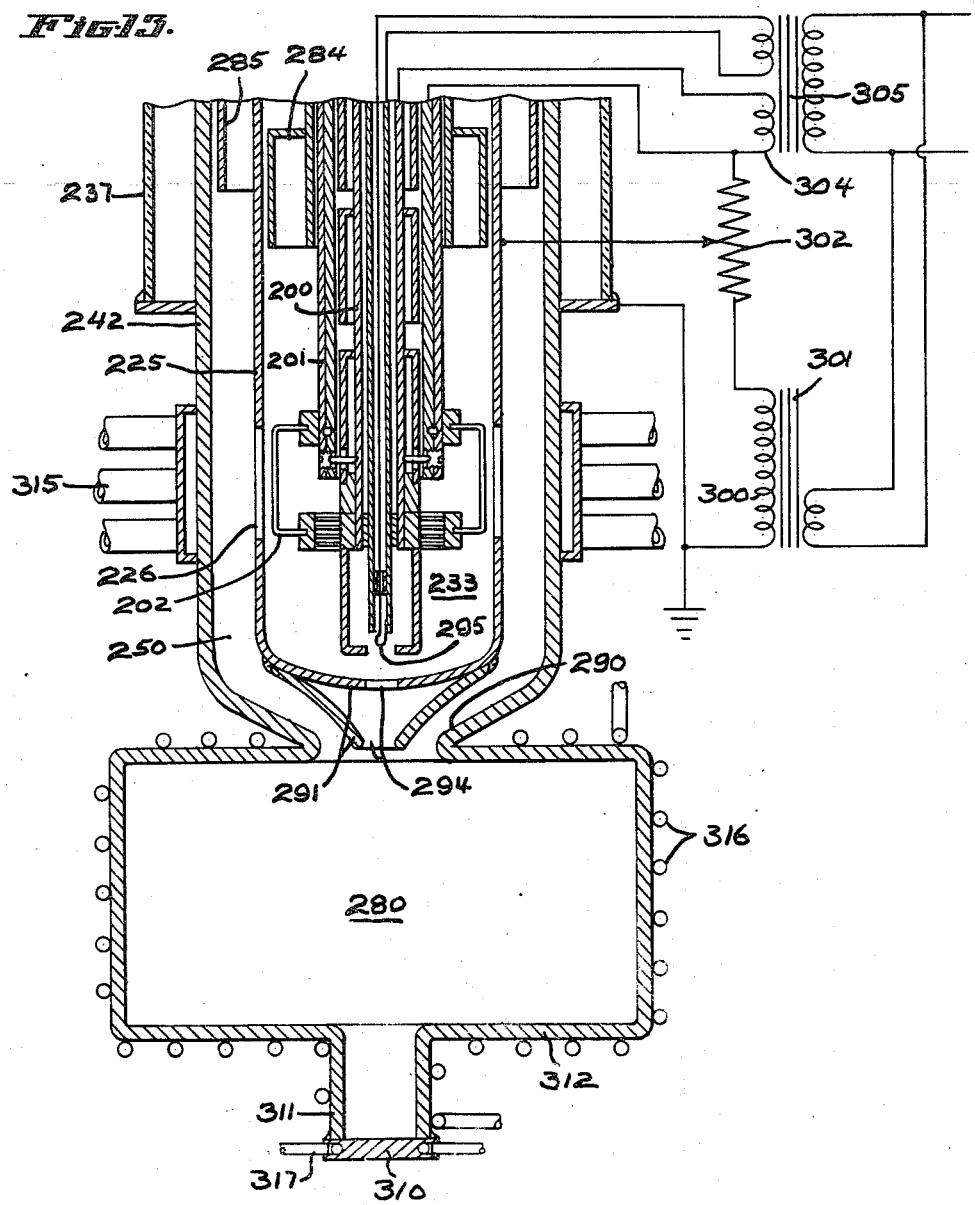

Patented Apr. 9, 1946

2,398,162

UNITED STATES PATENT OFFICE

2,398,162

MEANS AND METHOD FOR ELECTRON ACCELERATION

David H. Sloan, Berkeley, Calif., assignor to Research Corporation, New York, N. Y., a corporation of New York Application December 16, 1941, Serial No. 423,173

13 Claims. (Cl. 315—39)

My invention relates to a method and apparatus for electron acceleration at high energies and more particularly to an electron accelerator utilizing the energy of standing wave fields to accelerate electrons in quantity.

This application is a continuation-in-part of my copending application Serial No. 364,284 filed Nov. 4, 1940, and Serial No. 418,669 filed Nov. 12, 1941, respectively.

Among the objects of my invention are: To provide an electron accelerator of simple structure; to provide an electron accelerator capable of producing an effective electron beam accelerated to a velocity at which the energy is of the order of many million electron volts; to provide a sectional electron accelerator, which when energized, will produce electron acceleration in accordance with the amount of power supplied and the number of sections; to provide a means and method of producing standing wave fields properly phased to create electron acceleration therethrough; to provide a means and method of exciting a standing wave electron accelerator; to provide a means and method of driving a high-Q load; to provide a simple, efficient and readily constructed electron accelerator, whereby electrons can be effectively accelerated to ten or more million electron volts for use in medical therapy, either by direct application of the produced electron beams, or by the production of X-rays, or for similar purposes, and to provide a method and apparatus for accelerating electrons at high energies.

Resonators have heretofore been used for accelerating electrons to high energy in the development of powerful high-frequency oscillators. A study of the standing wave field distribution in transmission lines when the inner conductor is removed has led to the development of oscillator resonators which have very low resistances, and extremely large anti-resonant impedances.

Long cylindrical cavities, or wave guides, likewise permit the formation of standing waves therein having a very high impedance from node to node. The distance between such nodes, however is generally greater than the distance which light or an electron can travel in one-half cycle, and consequently such wave guides are impractical for use for electron acceleration.

I have found however, that the distance between nodes in an elongated wave guide, can be decreased for a fixed frequency by loading the wave guide. Loading can be accomplished by adding inductance (volume) near the current maxima, or by adding capacity (surface) near the voltage maxima, meanwhile maintaining a fixed distance between nodes. For axial standing waves in an elongated cylindrical wave guide, I have found that both inductance and capacity can be very simply added by bulging the pipe at current maxima, and constricting it at voltage maxima, thereby forming a sequence of cells. I thus obtain a wave guide whose internodal distance is now such that an electron traveling at a speed close to the speed of light can traverse it in one-half cycle, of a lower frequency.

An electron traveling along the axis of such a loaded wave guide, with a velocity close to that of light can receive an acceleration in one cell, and arrive in the next cell one-half cycle later, when the fields have all been reversed. These new fields entered by the electrons will now be in the proper direction to accelerate the electrons in the same direction as in the cell traversed one-half cycle earlier. The electrons can be made to serially traverse a sufficient number of cells to give the electrons a total acceleration which provides the desired energy.

I have embodied the above concept into practical devices for providing electrons accelerated to energies as high as ten to fifty million electron volts, dependent upon size and power characteristics, and several such devices will herein be described in detail.

In the drawings:

Fig. 1 is a diagram showing a normal cylindrical wave guide and the electric field of the standing wave pattern therein.

Fig. 2 is a diagram showing wave guide and the electric field of the standing wave pattern, loaded by forming a series of bulges and constrictions axially along the wave guide to lower the frequency.

Figures 3 and 4 are diagrams showing equivalent waves on a straight wire, as related to Figures 1 and 2, respectively.

Fig. 5 is a diagram showing one preferred modification of wave guide that can be utilized for the production of high velocity electrons.

Fig. 6 is a view partly in section and partly diagrammatic showing a wave guide similar to that of Figure 5, constructed for the production of X-rays.

Fig. 7 is a longitudinal sectional view of a tetrode tube adapted to energize the accelerator shown in Fig. 5 taken as indicated by the section line 7—7 in Figure 9.

Figure 8:
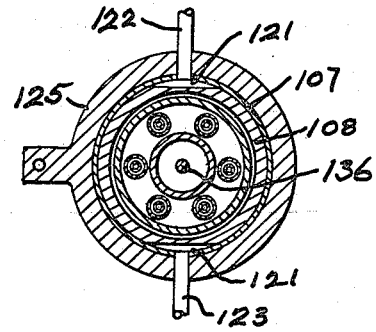
Figure 9:
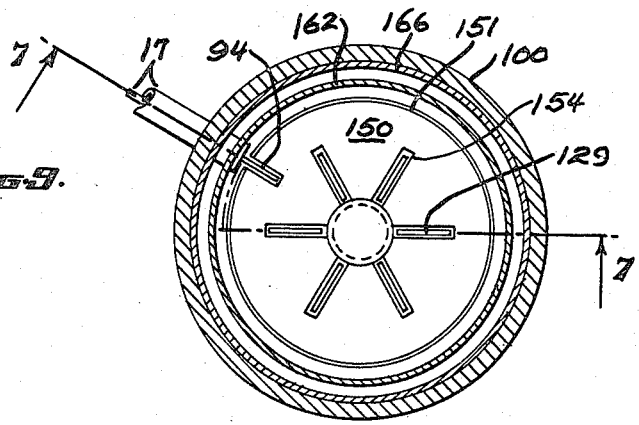
Figure 10:
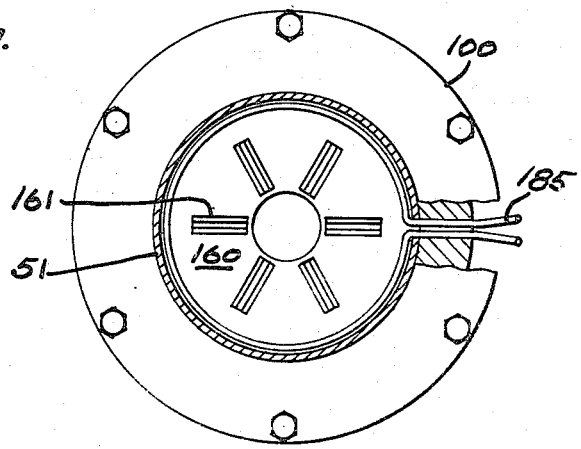

Figs. 8, 9 and 10 are cross-sectional views taken as indicated by section lines 8—8, 9—9 and 10—10 respectively in Fig. 7.

Fig. 11 is a longitudinal sectional view of a triode tube adapted to energize the accelerator shown in Fig. 5.

Fig. 12 is a cross sectional view of the tubes shown in Figure 11 taken as indicated by the line 12—12 in that figure.

Fig. 13 is a longitudinal sectional view of a direct coupled triode tube and single cell high voltage resonator utilized for X-ray production.

Referring directly to the drawings for a more detailed discussion and description of our invention, and first referring to a conventional elongated cylindrical wave guide 1, shown in Fig. 1, excited by a power source at the proper frequency to produce standing waves therein through a coupling loop 2, it will be seen that the field anywhere in the wave guide is due to the interference of four electro-magnetic waves, i. e., two distinct sets, each having two oppositely directed waves. Two axial waves interfere and establish the sequence of axially extending standing waves, and distribute energy to all of the standing wave loops but axial waves have their electric fields at right angles to the axis and contribute nothing to the useful axial electric field intensity. Consequently each cell also requires the interference of two oppositely directed radial waves. These latter waves can and do provide the axial electric field. When the resonator is energized at a frequency which will produce the indicated pattern, all four of these waves are present. Furthermore the frequency at which all four of these waves can coexist in the proper relative strengths, is the only frequency for which this pattern can occur.

However, in a wave guide of the form shown in Fig. 1 the frequency will be too high for an electron to travel between nodes in one-half cycle, i. e., the distance from node to node for a fixed frequency is greater than the distance that either light or an electron can travel in a half-cycle. Figure 3 shows diagrammatically the equivalent wave on a straight wire.

In order to gain more time, I lower the frequency meanwhile preserving the same internodal distance, by adding inductance where the magnetic field is greatest and by adding capacity where the electric field is greatest. I thus make room for more magnetic field lines, and shorten the electric field lines.

This condition can be produced for example, by forming a series of regular bulges 3 around the wave guide and a series of constrictions 4 therebetween as shown in Fig. 2, these bulges and constrictions being positioned to register with the appropriate electromagnetic and electrostatic fields. The wave guide is therefore bulged between nodes, and constricted at the nodes to lower the frequency. Figure 4 shows the equivalent wave on a straight wire.

In Fig. 5 another form of wave guide 1 is effectively thus loaded and divided into spaced half-wave cells 10 by diaphragms 11 with quarter wave end cells 12 and 13 in order that proper axial reflection may take place within the wave guide. The wave guide can be energized by an amplifier output transmission line 14 entering end cell 12 from an amplifier 15, the amplifier being preferably excited from an amplifier input transmission line 17 entering an adjoining cell 10. Amplifier output transmission line comprises an outer conductor 20 attached to wave guide 1 and an inner conductor 21 entering the wave guide as a loop 22 and returning to contact outer conductor 20. Amplifier input line 17 comprises outer conductor 25 and inner conductor 26 attached similarly to cell 10, with loop 27 entering this adjoining cell.

Power at the resonant frequency can now be supplied to the wave guide from amplifier 15 with the result that a high velocity electron axially entering the wave guide can travel from node to node in a half-cycle.

Axially directed electrons will be accelerated during such passage, if properly entered, and then the field will reverse as the electrons enter the next cell. The cells will be properly phased to continue to accelerate the electron during its passage through the next internodal distance. This acceleration can be theoretically continued indefinitely as the stream of electrons will be focussed along the axis of the wave guide. With each acceleration the electrons become heavier, as will be pointed out later, and forces which would otherwise tend to over-focus the electron are consequently less able to deflect them beyond the axis.

From a practical point of view, the extent to which this means and method of accelerating electrons can be carried out, is dependent only upon the physical length to which the accelerator wave guide can be extended, and the amount of power available for driving it. I will therefore next consider in detail, an electron accelerator designed to operate on approximately 100 kw. peak power at 30 cm. wavelength and with 30 half-wave cells to produce a dense beam of electrons having energies of the order of ten million electron volts for X-ray production.

Considering Fig. 6, the wave guide 1 is divided into cells as described in Fig. 5 with diaphragms 11 spaced approximately 15 cm. and of a diameter preferably in the neighborhood of .8 wavelength, dependent on the size of the diaphragm openings. At the one end of the wave guide a central electron inlet aperture 30 is provided. Aperture 30 is outwardly surrounded by an anode cylinder 31 having an axial anode aperture 32 pierced therethrough. Anode cylinder 31 is surrounded by an envelope cylinder 34 to which is joined, for example, by a metal-to-glass seal 35, a glass envelope portion 36 carrying a reentrant stem 37. Reentrant stem 37 has filament leads 39 passing therethrough supporting source 40 of a large number of electrons alined with apertures 32 and 30, and coaxially positioned with respect to the axis of the wave guide 1. The wave guide 1 is grounded, and the electron source 40 is held at a negative potential with relation to the wave guide and anode cylinder 34 by means of an accelerating source of D.-C. potential 41, later to be discussed.

Axially mounted in the other end of the wave guide 1 is an X-ray target 44 cooled by pipes 45, the X-rays being emitted axially from the target outside of the wave guide. Each cell is also provided with preferably separate water cooling pipe systems 46, in order that the temperature of each cell can be separately controlled, as will be explained later. In this case the entire wave guide is evacuated.

While there are many ways of energizing a high-Q load such as that provided by the resonator-wave guide just above described, I prefer to utilize either a tetrode or grounded grid triode. Driving a high-Q load, such as the wave guide above described, from an oscillator of fixed frequency is impractical, because of the slight frequency drift generally encountered due to heat changing the dimensions of the wave guide. A load-excited amplifier-oscillator is therefore preferred.

While I prefer that the excitation be obtained from energy stored in the load, there are obviously many ways in which this can be done. At the lower frequencies the anode, the load and the grid may interact through intervening coupling circuits, and elaborate precautions are then needed to prevent the grid from being more favorably excited by energy stored in one of the intervening coupling circuits, than by the load energy, and thus produce parasitic oscillation. However, by completely shielding the input from the output circuit of the tube, it then becomes possible to feed power to the grid directly from the load and the grid can receive energy from no other circuits. Neutralization circuits in themselves constitute possible parasitic circuits. Consequently, the shielding action of a grounded grid is preferred for isolating the input from the output, so that there can be only a single path from the output through the load back to the input of the excited tube.

As stated above, the tube used to excite the load can be either a triode or tetrode, preferably having in both cases, a grounded grid. I have found that for the shorter wave lengths a tetrode is more satisfactory, because the tetrode reduces the direct feedback and prevents the input from being excited by anode voltage arising from energy stored in the anode circuit, or in associated coupling circuits. Consequently, for wavelengths on the order of 30 centimeters a tetrode is to be preferred, whereas at higher wavelengths, such as 1 meter for example, a triode is highly satisfactory.

There are some advantages to be gained by constructing and operating the wave guide, for the longer wavelengths, inasmuch as more volts per cell at the same power can be obtained. This situation will be discussed in conjunction with the device as supplied by a triode and operating on the longer wavelength. Consequently, as I intend to utilize either triode or tetrode tubes to energize my accelerators, I will first consider the case where a tetrode is utilized to energize the wave-guide at a wavelength of 30 centimeters in accordance with the description previously given above. Such a tube is shown in Fig. 7, this figure being a combination of Figures 18 and 8 of my copending application Serial No. 364,284 filed November 4, 1940, and entitled "High frequency electronic tube," cited above.

Referring to Fig. 7 and the associated section views of Figs. 8, 9, and 10 an anode cavity resonator 50 is formed by an accelerator grid member 51, surrounding an anode body 52.

The support of this anode body is from the mid- or quarter wavelength point of the anode body, i. e., at a potential anode, so that there is little tendency for power to escape from the support structure. Such tendency as there is for power to leak from the support point is suppressed by either or both of two methods. First, and preferable is the case where the tube may be predesigned to operate at a fixed wavelength, is a movable plate 53 mounted on the sliding rod 54 passing through a Wilson seal 55 in accelerator grid member 51, and making contact with the accelerator grid member 51 by means of a spring skirt 57. Plate 53 may be adjusted to bring the node of the resonant line accurately at the point of anode body support. The plate 53 may however be more useful as a tuning device, and therefore the principle of a transmission-line-choke support is employed to prevent power escape.

In the construction here shown a side tube 60 of relatively large diameter is welded at substantially the midpoint of the accelerator grid member 51. The side tube carries a metallic flange 61, with a glass insulator tube 62 fitted against it, and in turn carrying a terminal flange 64. Through this terminal flange passes a pipe 65 which projects through a support aperture 66 in the side of the accelerator grid member, and on the end of which the anode body 52 is attached. The action here will be described following the mechanical description of the anode, as the expedients adopted are predicated upon the necessities of the mechanical structure.

From the electrical point of view the anode body is a simple cylinder with closed ends. Its complexity is due primarily to the provision for circulating cooling water within it, and to the provision of what may be termed a "rough tuning" device.

Owing to the desirability for providing cooling, the body itself must be water-tight, and accordingly it is constructed of a flared cylinder 70, to the flared end of which the anode face 71 is hard-soldered. The other end of the cylinder is closed by a threaded disc 72.

The supporting pipe 65 enters the flared cylinder 70 through an aperture in the side thereof. The end of the pipe is threaded into a boss 74 on an inner baffle cylinder 75, which boss is soldered to the inner wall of the cylinder 70. The boss 74 extends internally to form a cylindrical chamber 76, which connects by a side pipe 77 through the end 78 of the baffle cylinder 75, so that water introduced through the pipe 77 is discharged directly against the active face 71 of the anode, and thence is forced around the exterior of the baffle cylinder to reenter its open end. It can then return within the cylinder to enter the open end of a return pipe 79, which is mounted concentrically within the pipe 65 by means of a perforated cap 80 which fits over the end of the pipe 65.

The outer end of the pipe 79 is centered in the pipe 65 by means of a metal bellows 81 which is sealed to both pipes and permits differential expansion between the two. Water is introduced into the pipe 65 through a side pipe 82.

A disc 85 is connected to the flange 61 both electrically and mechanically, and carries a cylinder 86. The pipe 65 and the cylinders 60 and 86 form a transmission line one full wavelength long. Electrically this might equally well be a half wavelength line, but additional space is needed for the insulating cylinder 62, which must withstand the full D. C. anode potential of 20,000 volts or more. The length of this section is measured from the anode and its housing, and the impedance at its outer end is very high, so that looking into it from the anode the impedance is also very high.

This high impedance is connected in shunt across the line formed by the anode body 52 and accelerator grid member 51 very near the nodal point, where the impedance of the latter line is low, and accordingly a very small portion of the current flowing at this point will take the high impedance path to the outer world.

In other terms, the full wave line is connected so near the node of the main anode oscillator circuit that only a few volts are effective across its termini, and therefore very small currents will tend to flow therein, representing a power loss of $V^2/Z$ where V is the small input voltage and Z the large input impedance. Moreover, since the line is one wavelength long, only the small voltage V will be effective to cause radiation from the radiating system constituted by the end of the line.

It has already been stated that fine tuning of the anode resonator can be accomplished by means of the plate 53. Greater changes in wavelength or operating frequency can be secured by placing a cylindrical shell 90 around the anode body. The effect of such a shell is twofold, since it increases the capacitance of the line formed by the body and the housing, thus tending to increase wavelength or decrease frequency, but it also serves to decrease the inductance, with opposite effect. In a device of approximately the proportions shown, however, the effect of decrease of inductance is more pronounced than the effect of increase in capacitance, and hence the overall effect is to raise the frequency of operation of the tube. The extent of the effect produced by the shell may be increased by chamfering the end, where the effect on the capacity is greater than on the inductance. Because of possible differential expansion the shell is solidly secured to the anode body only at the anode end, contact with the opposite end flange being made frictionally by resilient fingers 91 formed by slotting the end of the cylinder 90 longitudinally.

Radio frequency power developed in the anode circuit may be transferred to wave guide 1 by the outer conductor 20 of the amplifier output line 14, welded or otherwise sealed to the side of the accelerator grid member with central conductor 21 of line 14 entering the side of the accelerator grid member through an aperture 92 and bent as a loop 94, parallel to the axis of the anode body substantially at the potential node (and current loop) of the anode resonator 94. It may be convenient to make the loop 94 of small-bore metal tubing so that it may be water cooled by liquid carried in through the central conductor 21. In this case the tubing may be brought out of the anode resonator as shown, and coiled around and soldered to the outer conductor 20 of the line 14 to cool it also between the tube and the wave guide 1.

The envelpe comprises an accelerator grid supporting flange 100, which is built with a skirt 101. This is followed by an insulating cylindrical housing section 102, a control grid flange 104, another short insulating section 105, and a filament support flange 106 in the order named. The latter flange 106 is dished downwardly, and through it passes the main central filament support column, which comprises an outer tube 107 and inner tube 108, the ends of which are set in a counterbore and soldered or welded to an end flange 110. Against this flange abuts an insulating gasket 111, and the end-plate 112 of the tube is held between this gasket and a second gasket 114 by means of a clamping ring 115 and tie-bolts 116, thus completing the outer envelope of the tube.

The central supporting column 107—108 holds the outer ends of a plurality of radially extending filaments 129, which are set in a terminal ring 120. Two sides of the inner tube 108 of the column are flat and are indicated by the reference character 121 in Fig. 8. The space formed between the inner and outer cylinders act as a conduit for cooling circulation, which is let into and out of the channel thus formed by the pipes 122, 123 respectively, these pipes entering at the plane of a ring 124 which also carries a connecting lug 125 for the filament lead. The two channels 121 are connected at the top of the column.

The inner ends of the filaments 129 are supported upon L-shaped lugs 130 carried on the ends of support pipes 131. These pipes extend the full length of the column and emerge through the end-plate 112. Each is supplied with an inner pipe 132, which carries water from the bottom of the preceding one of the pipes 131 and projects it against the lugs 130, the circulating water returning to the bottom of each of the pipes 131 outside of the inner pipe 132, thence to be carried to the next pipe in the system. Between the pipes 131 and the inner cylinder 108 of the central column is mounted a cylindrical conductor 134 which is three-quarters wavelength long and terminates closely adjacent the filaments. Its lower end is closed by a conducting disc 135, supported by and spaced from the bottom flange 112 by both a tie-bolt 136 and a spacer pipe 137, with which the disc 135 and the flange 112 are electrically continuous, so that they form the other end of the filament circuit, the flange 112 being provided with an axial lug 139 for connecting a filament lead. The end flange 112 also carries a conducting cylinder 140, which is a quarter wavelength long and terminates slightly below the disc 135.

The water pipes and connecting lugs form a high impedance antenna, fed by a low impedance quarter wave line comprising the conductors 108 and 140 which give it negligible series impedance and so form a by-pass which makes the tube 140 effectively continuous with the tube 108 at high frequency although insulated against filament supply frequency and voltage. The tube 140, together with the water pipes 131 and spacer tube 137 form a closed end quarter wavelength line, presenting a high impedance when viewed from the filament end.

A similar series-line by-pass effect to that offered by the lower quarter wavelength section is offered by the upper three-quarter wavelength section formed by the conductors 108 and 134, and in like manner also the filament-support pipes 131 form the inner conductor, and the three-quarter wavelength cylinder 134 forms the outer conductor of the three-quarter wavelength line, closed at the end, and offering very high impedance. R. F. transmission from the internal or filament-support structure is therefore prevented.

The grid 150 is supported at the top of a cylindrical column 151, borne by inner extension 152 of the grid flange 104. The grid takes the form of a flat plate in which the grid apertures are slots 154 whose edges form the surfaces giving the proper curvature of the field. A quarter wavelength series-line by-pass and choke is formed by a tubular skirt 155 mounted on the filament support column tube 107. The grid-filament circuit is brought to exact resonance; the closed end, three-quarter wave transmission line comprising the skirt 155, grid column 151, the grid 150 and filaments 129 themselves, being tuned to exactly three-quarter wavelength. This tuning is done by sliding the skirt 155 on the filament support tube column 107 to get the final exact adjustment which gives the necessary high impedance at the grid. The adjustment is made by means of a concentric water fitting comprising an external pipe 156 and an internal pipe 157 which circles and coils the skirt 155. The outer pipe emerges through a Wilson seal 159 in flange 106, so that the skirt can be adjusted, using the external extension of the fitting as a handle.

Tuning with a slider of this type, which in itself is practically a quarter wave choke, has the great advantage that the junction between the slider and its supporting column necessarily comes substantially at a current node. Accordingly there is much less difficulty with heating at the sliding contact than where such contact occurs in the vicinity of a current loop.

The grid 150 is operated at radio-frequency ground, and may itself be considered as a boundary grid terminating the grid-filament line, while it is the filament which swings in potential with relation thereto. The accelerator grid 160 comprises a relatively thick plate with apertures 161 for the passage of the electrons. The quarter-wave open-end by-pass line section between control grid 150 and accelerator grid 160 is terminated at the interspace between the two, and comprises the space between the cylinder 151 supporting the grid 150 and a short length of tubing 162 which is mounted on annular spacers 164 and 165 on a cylinder 166 fixed to the interior surface of the flange 101. Another annular spacer 167 within cylinder 166 carries an upwardly extending skirt 169 which terminates a small distance below the by-passing line 162. Another short cylindrical section of conductor 170 is mounted concentrically with the grid column within, above and below, the flange 104. This conductor acts as a part of a choke, but its primary function is to displace the point of radio-frequency stress from the seal.

Again proceeding from the lower end of the device upwardly the section comprised of the conductors 155 and 170 is a closed-end choke, preferably quarter wave, offering high input impedance to the section above it. Feeding into this high impedance section is an open-end, quarter-wave blocking or by-pass section comprising conductors 155 and 169 and making these conductors electrically continuous, so that conductors 166 and 169 become the high impedance closed-end quarter wavelength line into which the control grid-accelerator grid section feeds. This impedance gives the grid-accelerator section, as an open-end, one-quarter wavelength line, negligible impedance, and effectively shorts the two grids at radio-frequency, although they are insulated against their D.-C. potential differences.

The grid-filament circuit is driven by means of a coupling loop 180 formed on the end of conductor 26 brought in through exterior conductor 25 of amplifier input line 17 through the flange 101. Where the loop emerges from the line 17 its grounded side is brought in coplanar with the control grid disc 150, lying in a slot 181 in the disc as shown in Fig. 9. The loop 180 is located not far from the potential node and current loop in the grid-filament line, and its size is proportioned to give a satisfactory input impedance. By means of this loop the cathode resonator is driven from the transmission line 17 connected to the wave guide 1, so that the tube as a whole acts as an amplifier, supplying power to the wave guide and driven therefrom.

Cooling of the accelerator grid is accomplished by a water pipe 185, brought in through the flange 101 and forming a single turn in contact with the grid disc 160. Another cooling pipe 186 is brought in through the flange 104, encircles the central column slightly below the filament plane, in contact with the outer conductor 151 of the grid-filament line.

This tube is designed for operation with the grid 160 at ground potential, and with the filament at accelerating potentials negative to ground. The grid 150 operates at R. F. ground potential and may be considered as a boundary grid terminating the grid-filament line, while it is the filaments which swing in potential with relation thereto. Owing to the method of coupling the grid circuit, it is extremely sharply tuned. The tube is accordingly critical in adjustment, but the number of adustments is low, namely, the tuning of the anode circuit and the tuning of the sliding skirt 155, and the value of the accelerating voltage.

The tube is energized by connecting the anode body to one end of a pair of series connected transformer secondaries 190, the other end being connected to filament connecting lug 125, the midpoint 191 of the secondaries being grounded. Flange 100 is grounded, placing grid 160 at ground potential. The filaments are supplied by filament transformer 192, the secondary of which is connected to filament connection lugs 125 and 139. At the higher frequencies, within the range of operation, high anode voltages, to give high powers, will give half-cycle transits along the lengths of path here provided and I prefer to use this mode of operation of the tube to energize wave guide 1 at 30 cm. wavelength, the anode voltage being adjusted to give the proper transit time. Grid 150 is connected through grid leak 193 to ground.

The tube therefore acts as an amplifier-oscillator, delivering power directly to the wave guide through loops 96 (Fig. 7) and 22, (Fig. 6) and being excited directly from the wave guide by loops 27 (Fig. 6) and 180 (Fig. 7) through transmission lines 14 and 17, respectively. There is no other path for energy between the oscillator and the load and therefore no parasitic oscillations develop. I prefer that the wave guide load and excitation loops 22 and 27 be coupled to the wave guide 1 in adjacent cells, so that the phase will reverse and prevent oscillation at the nearby frequency for which the standing waves are not oppositely polarized.

In operation of the accelerator, the tetrode and circuit as described is energized to excite the wave guide 1. Filament 40 is heated, and anode source 61 is connected. Electrons from filament 40 thus enter the wave guide and start along the axis thereof. The electrons may be grouped, if desired, into synchronized pulses before entering the accelerator system by modulating the electron gun with R. F. from the anode transmission line through a conventional grid not shown. However, in most cases such a grouping is not necessary.

After the electrons enter the first section 12 of the wave guide, they are accelerated along the wave guide until they reach X-ray target 44, receiving an additional acceleration as they pass through each cell of the wave guide. With three kilowatts peak power per cell, each cell will develop, at 30 centimeter wavelength, about 500 kilovolts, about .7 of which can act usefully upon an electron passing through the cell. Thus 30 cells with 100 kw. peak power delivered by the exciting oscillator, will give electrons in the beam impacting the X-ray target an acceleration on the order of 10 million electron volts. As each interior cell is approximately 15 cm. long such an accelerator has an overall length of only 450 cm. or roughly 15 feet.

The design of the initial cells of the wave guide will depend upon the velocity with which the electrons enter the wave guide. An electrostatic generator can be used for example as a source of anode potential to produce initial accelerations of one-half to two million electron volts or a single cell accelerator can be used, as pointed out later. Under these conditions all of the cells or compartments except the first and last can be substantially identical. If however, the electrons are injected into the wave guide at lower velocities, then the first few cells in the wave guide may have shorter lengths in order to bring the entering electrons up to a velocity that is close to the speed of light and nearly constant, before entering identical cells.

It is also important that the diameters of all identical cells be kept nearly exactly equal as possible in order for each of them to have equally strong radial reflections at the frequency of the combined coupled system. The electric field of a cell having excessive energy therein will spread into the adjoining cells, creating a greater effective distance between nodes and consequent deficient capacity. This can be corrected by increased inductance obtained by increasing the diameter of the cell. I have found in most cases that the diameters of the cells are automatically maintained exact, as those which are smaller receive too much energy, and overheat. Consequently they expand and enlarge to proper size. In accordance with this action, if discrepancies are too great for automatic control, very accurate control of the cells can be obtained by controlling the amount of cooling water delivered to each cell of the line, and separate cooling systems are provided for this purpose.

Thus it will be seen that I have provided an electron accelerator in which the entering electrons are accelerated axially to a velocity approaching that of light. As the velocity of the accelerated electrons approaches a limiting value equal to the velocity of light, the velocity increases very slowly with increasing energy. Further acceleration results therefore, chiefly in increasing the relativistic mass of the electrons, such high velocity electrons produce very penetrating X-rays, and these high velocity electrons are produced in large quantities. The effective increase in mass greatly aids the focussing action of the wave guide, as the electrons are less able to be deflected from their axial courses as they pass along the accelerator. A large percentage consequently impact the target.

While I have described the above device as designed for generating copious numbers of electrons having accelerations on the order of 10 M. E. V. for the production of X-rays, it is in many cases highly desirable to produce effective electron accelerations of 15 to 20 M. E. V. in order that an electron beam can be directly applied to living tissues. Electrons at 15 to 20 M. E. V. deliver less energy per millimeter of path than do electrons at lower accelerations. Consequently such beams can be applied directly to living tissues for release of their energy below the surface of the tissue without seriously damaging the surface.

By utilizing approximately double the number of cells in the device similar to that previously described, electron energies of 15 to 20 M. E. V. can be produced. This would only involve the use of an accelerator about 30 feet long. This accelerator would however, require double the power. If electrons at 15 to 20 M. E. V. are to be produced in such an accelerator with 30 cm. excitation, two exciting tetrodes as described should be utilized, each feeding into and excited by adjacent cells, respectively, the second tube feeding cells placed intermediate the ends of the wave guide.

It is not important where the wave guide is energized nor is it important how many tubes are utilized to feed it. However, in order to avoid complexity and duplication of parts, it may be preferable to utilize a longer wavelength and thus obtain more volts per cell, and to utilize a single triode for the excitation of the wave guide.

At 1 meter for example, each cell will be approximately one-half meter long. Fifty such cells, make the wave guide approximately 25 meters long and approximately .8 meter in diameter, which structure is not excessively large when it is considered that 15 to 20 M. E. V. electrons are produced thereby. The general construction of such a wave guide is exactly similar to that which has been previously described. The only difference, except for dimensions, will be the type of tube I prefer to utilize to excite the wave guide at the lower frequency. A triode suitable for this purpose has been described in my copending application Serial No. 418,669 filed Nov. 12, 1940, entitled "High frequency triode oscillator," and is shown as modified for use as an amplifier, in Fig. 11 herein, operated at a peak power giving 15 to 20 M. E. V. electrons in the 50 cell accelerator, on the order of 100 kw.

Referring to Figs. 11 and 12 for a more detailed description of a triode suitable for energizing wave guide 1, concentric inner and outer filament supports 200 and 201 are provided and these supports may be, if desired, water cooled.

The axially disposed filaments 202 are supported on one end thereof by blocks 204 attached to the inner filament support flange 205 by a plurality of spaced layers of resilient fins 206 so that the filaments can expand and contract during heating without exerting pressure between filament supports 200 and 201.

Due to the resilient filament connection, inner and outer filament supports can be sealed together by the use of spaced annular insulating rings 207 and 208, such as of glass or ceramic, separated by a rubber ring 209. These rings are slidably positioned around the inner filament support 200 and are spaced from the fixed base of the outer cathode choke 210 by a short spacing sleeve 211. A long spacing sleeve 212 is then led outwardly along support 200 and slidable thereon to contact an outer glass ring 214 spaced from a second outer glass ring 215 by a second rubber ring 216.

Pressure is applied to force filament support 200 outwardly, through a glass pressure ring 217 outside of the tube, forced against the end of filament support 201 by the use of screws 219 threaded through a connection block 220 fastened to the inner filament support 200. The pressure applied by screws 219 forces the glass elements of the two sets of glass rings together, thus expanding the intermediate rubber rings against filament support 200 and a sealing sleeve 221 inwardly attached to outer filament support 201. An effective and vacuum tight seal between the inner and outer filament supports 200 and 201 is thus procured. The inner and outer cathode supports are firmly tied together and, due to the resilient support of filaments 202, filament breakage during tube transport is eliminated.

The grid 225 is shaped and positioned to surround the filament support and the filaments 202 register with grid slots 226 for electron passage to the anode. Grid 225 is supported by a heavy frame 227, this frame being connected to filament support flange 229 by a glass cylinder 230, thus completing the tie-up between the grid and the filament supports. A choke-line-choke system 231 is provided in the space between the outer filament supports 201 and the grid 225 to prevent loss of radio-frequency and the space between filament support flange 205 and the outer filament support 201 is shorted to R. F. by quarterwave cylinder 232. The inner end of the grid is closed by a grid cap 235. A cathode-grid resonator 233 is thus formed.

Attached to the outside of the grid 225 above the lateral flange 227, is a second lateral grid flange 236 extended outwardly in steps to support a cylindrical glass anode insulator 237, the top of which is closed by an anode disc 239, through which pass a plurality of internally looped water cooling pipes 240, the loops 241 being welded to anode cylinder 242 closed by anode dome 243. Adjacent pipe loops 241 are connected on one side by anode material and each such connected pair of loops are spaced so that the spaces come opposite the grid slots 226 and the filaments 202. Thus, the electrons emitted from the filaments, after being decelerated, pass between adjacent loops of the water cooling pipes into the space 245 between the anode 242 and the glass cylinder 237. The glass charges up and repels the electrons, which are then collected by the outer surface of the anode and the pipes themselves. Inasmuch as the electrons become widely dispersed within this space, no hot-spots can appear on the anode at any point.

Anode potential is supplied to the anode disc 239 through connection 246. Inasmuch as it is desired to operate the grid of this tube at ground potential, a permanent connection of a vacuum line 247 can be made to the grid structure between flanges 227 and 236.

I prefer to terminate the anode resonator 250 in an inner quarterwave choke and line section A followed by an annular quarterwave line B; a choke C followed by a quarterwave line D; backed up by a quarterwave choke E, line F and final choke G, these lines and chokes being annularly disposed.

Such a termination of the anode resonator permits the power take-off loop 94 to be inserted through frame 227 and the stepped flange 236 of the grid at a region of maximum current in the first choke A, which is also a part of the anode resonator. The cathode resonator is closed to R. F. by quarterwave anti-resonant chokes X and Y spaced on filament support 201 by an electrical quarterwave line portion thereof.

The input transmission line 17 from the wave guide 1 passes through frame 227 close to output line 14, and exterior conductor 25 of input line 17 is attached to grid 225 around an aperture 251 through which internal conductor 26 may pass and return to external conductor 25 to form the coupling loop 180. The anode resonator therefore directly feeds the load, and the cathode resonator is excited directly from the load.

Anode 242 is energized by connection of one end of secondary 252 of an anode transformer 253 to anode connection 246 with the other end of secondary 252 connected to outer filament support 201 through a resistance 254. Frame 227 supporting grid 225 is grounded and also connected to resistance 254 intermediate the ends thereof to provide a cathode bias of approximately 1000 volts. Anode voltage is in this case adjusted so that the tube operates on a transit time approaching zero half cycles, due to the lower frequency at which the tube operates.

In this case X-ray target 44 on the end of wave guide 1 may be dispensed with, substituting at the same position, any conventional electron permeable window so that the electron beam may pass out of the wave guide into the surrounding atmosphere.

The grid is grounded, thus providing complete shielding, (except for the anode-cathode capacity, negligible under these conditions) between input and output circuits. The tube operates as a tuned-anode, tuned-cathode amplifier directly feeding into and directly excited from the wave guide, and no parasitic oscillations can be produced.

I have described above, a type of electron accelerator having multiple cells. The same general principles of operation however can be applied for electron acceleration in a single cell when lower electron energies are satisfactory.

In Fig. 13 I have shown such a device based on the triode just above described, where the oscillator is directly connected to the load, which in this case is a single cell half wave resonator 280 formed as a closed continuation of cylindrical anode 242 of a grounded anode tube somewhat similar in construction to that shown in Fig. 11. The tube proper comprises filaments 202 mounted on filament supports 200 and 201, and surrounded by a grid 225 having slots 226 therein through which the emission from filaments 202 reaches the anode 242. The filament structure and the inner grid surface form the cathode resonator 233 and the outer grid surface and the anode form the anode resonator 250. Both of these resonators are closed to R. F. at the outer ends by high impedance anti-resonant choke systems 284 and 285 respectively as used to close the grid-filament resonator 233, in Fig. 11.

Half wave resonator cell 280 is connected to anode 242 by a constricted portion 290 and the adjacent end of the grid 225 is preferably provided with a divided end portion 291, both portions of these end walls being provided with registering axial apertures 294. The division of the end of the grid permits both anode and cathode resonators to be shaped and tuned so that both will have a standing wave voltage loop registering over the filaments and the grid slots, preferably an electrical one-half wave length from the axis of the curved grid and anode ends.

The anode resonator is shaped by constriction 290 to join the single cell resonator 280 at junction points where the currents in the adjoining resonators are equal when the anode resonator voltages are in correct relationship to develop and deliver full power to the single cell high voltage resonator 280.

The tube in this case is preferably energized by connecting one end of secondary 300 of anode transformer 301 to anode 242 which is grounded. The other end of anode transformer secondary 300 is connected through a bias resistor 302 to one side of the filaments which are supplied by filament winding 304 on filament transformer 305. The tube when energized operates as a tuned-cathode tuned-anode oscillator with the anode and cathode resonators coupled only by the anode-cathode capacity with the grid as an untuned D. C. biased structure floating at R. F. potentials induced in it by the anode and cathode resonators. The anode voltage, for the higher frequencies is adjusted for a one-half cycle transit time as for example when exciting high voltage resonator 280 at from 10–20 cm. wavelength. However the same tube construction can equally well be used at much longer wavelengths to energize a larger and properly dimensioned high voltage cell 280, for example at one meter wavelength, using however in this case a transit time approaching zero half cycles, i. e., a transit time of 10°–30°. When the single cell resonator 280, is energized by the direct connected tube as described, there is no other nearby frequency at which the anode resonator can resonate, and in the tube shown the tuned cathode resonator can be correctly and unambiguously excited through the simple anode filament capacity feedback.

In order to make proper use of the high voltage developed in the single cell 280, an electron emitter 295 is positioned on the end of the inner filament support 200, in the intense electric field at that point, to produce a stream of electrons which will pass through end apertures 294 in the grid. This stream of electrons will be accelerated through the resonator cell 280, by the standing wave fields exciting therein as described in the prior modifications of my device, to produce X-rays when impinging on X-ray target 310 positioned in an axial extension 311 of the end wall 312 of the high voltage resonator cell 280. Due to the high power dissipated in the device I prefer to provide anode 242 with an anode cooling system 315, the cell 280 with a cell cooling system 316, and the X-ray target 310 with a target cooling system 317.

Inasmuch as the electrons passing through resonator cell 280 do not enter at a speed approaching that of light, the internodal distance is made to be less than one-half wavelength in order that the electrons may traverse the axis of the space in a one-half cycle.

Thus, in the example shown in Fig. 13, a very simple, compact electron accelerator can be produced. The peak power for the single cell can be made to be very high, as the entire power of the tube is utilized in the cell 280. A million-volt X-ray tube can thus be produced with a very simple structure, with approximately 100 kw. peak power supplied thereto. However while I have shown high voltage resonator cell 280 energized by a triode, a tetrode such as that shown in Figure 7 can also be used in case greater efficiency is desired. The cell 280 can be connected to the anode exactly as in the case of the triode, but in this instance a transmission line such as line 17 is used to excite the grid cathode resonator directly from the cell 280 in order that proper input be supplied.

Furthermore, it will be seen that, if desired, the X-ray target 310 of the single cell high voltage resonator 280 can be removed and the electrons passing through the cell 280 can be injected through entrance 80 of the accelerator shown in Fig. 6, replacing the electron gun there shown, to provide an initial beam acceleration on the order of 1 M. E. V.

If a tetrode is used as suggested just above, the efficiency and power of the tube may be sufficient to permit the use of several cells in series similar to those of wave guide 1, provided with diaphragms having graded spacings to allow proper transit of electrons along the axis of the cells as the electrons are accelerated. Thus my invention may take the form of a single direct coupled cell, multiple direct coupled cells or multiple cells directly driven from separate amplifiers, with final electron energies limited only by A.-C. power available, number of cells utilized, and the frequency of oscillation.

While the conventional term "transit time" has been used throughout this specification, I wish it to be distinctly understood that this term is used herein as meaning the period elapsing between the time of maximum emission from the filaments and the time of maximum work performed by the emitted electrons on the load field. This distinction is made, inasmuch as in some cases the actual electron transit time from conductor to conductor is not necessarily the true electron work period, as for example when the electrons travel part way while fields are near zero of cycle.

My invention possesses numerous objects and features of advantage, some of which have been set forth in the foregoing description of specific apparatus embodying and utilizing my novel method. It is however to be understood that my method is applicable to other apparatus, and that I do not limit myself in any way, to the apparatus of the present application, as I may adopt various other apparatus embodiments, utilizing the method, within the scope of the appended claims.

I claim:

1. In combination with an electron discharge tube oscillator having a tuned resonator formed between an inner and an outer element of said tube, an axially symmetrical substantially closed member having a substantially clear interior chamber axially joined to said outer member around a communicating axial aperture, and an electron emitting surface mounted on said inner tube element, and means for energizing said tube to create standing waves in both said resonator and said chamber with the field of the standing waves in said chamber directed to accelerate electrons from said source through said aperture and axially through said chamber to impact the wall of said chamber opposite said aperture.

2. An electron accelerator comprising a hollow elongated substantially closed wave guide, diaphragm means dividing said wave guide into a plurality of separate axially intercommunicating cells, the end cells being of quarter wavelength with intermediate identical half wavelength cells, means for energizing said wave guide to produce standing wave fields therein with the nodes thereof registering with said diaphragms, and means for axially introducing high velocity electrons into one end of said wave guide.

3. Apparatus in accordance with claim 2 wherein the diameter of said wave guide is on the order of .8 wavelength.

4. Apparatus in accordance with claim 2 wherein each of said cells is provided with a separate cooling system.

5. An electron accelerator comprising an elongated axially symmetrical substantially closed wave guide having an axially clear space therein, a plurality of inwardly extending diaphragms dividing said wave guide into cells, the end cells being electrically of quarter wave length, with intermediate electrical half wavelength cells, said wave guide being loaded by said diaphragms to provide internodal distances such that an electron can traverse such distances when travelling at a velocity less than that of light, alternating current supply means for energizing said wave guide to create a standing wave pattern therein having nodes registering with said diaphragms, one end of said wave guide having an axial aperture therein, an electron emitting surface positioned outside of said wave guide in alinement with said aperture, a source of high potential connecting said surface and said wave guide to direct electrons from said surface through said aperture and axially into said wave guide.

6. Apparatus in accordance with claim 5 wherein said current supply means is a concentric transmission line having the inner conductor thereof entering the periphery of one of said cells.

7. Apparatus in accordance with claim 5 wherein said alternating current supply means is an electron discharge amplifier tube having an anode, cathode and a grid, and wherein the grid of said tube is grounded with the anode thereof directly coupled to said wave guide by an output transmission line, said cathode being excited directly from said wave guide by a second transmission line.

8. Apparatus in accordance with claim 5 wherein said alternating current supply means is an electron discharge amplifier tube having an anode, cathode and a grid, and wherein the grid of said tube is grounded with the anode thereof directly coupled to said wave guide by an output transmission line, said cathode being excited directly from said wave guide by a second transmission line, said transmission lines being respectively coupled to said wave guide in adjacent cells.

9. Means for driving a high-Q load such as a hollow resonator comprising an electron discharge tube amplifier having a tuned anode circuit, a tuned cathode circuit, and a grounded grid shielding anode from cathode except for electron permeable portions of said grid, means for directly coupling said anode circuit with said load and means for directly exciting said cathode circuit from said load.

10. Means for driving a high-Q load such as a hollow resonator comprising a pair of coaxial transmission lines each having an outer conductor connected to the wall of said load resonator and an inner conductor entering the interior of said load resonator, a vacuum tube electron permeable grid connected to both outer conductors of said lines, an anode on one side of said grid, a cathode on the other side of said grid, said anode and said cathode being shaped to form the internal conductors of anode and cathode resonators respectively, the material of said grid being extended to form the external conductors of said latter resonators, the internal conductors of said transmission lines separately entering said anode and cathode resonators as output and exciting loops respectively.

11. Means for driving a high-Q load such as a hollow resonator comprising a pair of coaxial transmission lines each having an outer conductor connected to the wall of said load resonator and an inner conductor entering the interior of said load resonator, a vacuum tube electron permeable grid connected to both outer conductors of said lines, an anode on one side of said grid, a cathode on the other side of said grid, second electron permeable grid intermediate said cathode and first grid said anode and cathode being shaped to form the internal conductors of anode and cathode resonators respectively, an extension of said joined outer transmission line conductors shaped to form the outer conductor of said anode resonator, an extension of said first grid shaped to form the outer conductor of said cathode resonator, the internal conductor of one of said transmission lines entering said anode resonator as an output loop, the internal conductor of said other transmission line entering said cathode resonator as an exciting loop.

12. Means for driving a high-Q load such as a hollow resonator comprising a pair of coaxial transmission lines each having an outer conductor connected to the wall of said load resonator and an inner conductor entering the interior of said load resonator, an electron emitting cathode shaped to form the inner conductor of a cathode resonator, a grid shaped to form the outer conductor of said cathode resonator and having an apertured portion registering with said cathode, an anode positioned to receive electrons from said cathode through said apertures, and forming one conductor of an anode resonator, a conducting surface forming the other conductor of said anode resonator.

13. An electron accelerator comprising an axially symmetrical substantially closed conducting member having a substantially clear interior chamber therein of approximately one-half wave in length and approximately .8 of a wavelength in diameter, alternating current supply means for energizing said member to produce a standing wave pattern in said chamber having an axial electron accelerating field, said alternating current supply means including a driven resonator axially connected to said chamber around an aperture in said member, and means positioned within said driven resonator for directing electrons through said aperture into said chamber.

DAVID H. SLOAN.